US010776301B2

United States Patent
Glickman

(10) Patent No.: US 10,776,301 B2
(45) Date of Patent: Sep. 15, 2020

(54) COMPUTER SYSTEM AND A COMPUTER DEVICE

(71) Applicant: Jonathan Glickman, Needham, MA (US)

(72) Inventor: Jonathan Glickman, Needham, MA (US)

( * ) Notice: Subject to any disclaimer, the term of this patent is extended or adjusted under 35 U.S.C. 154(b) by 0 days.

(21) Appl. No.: 16/009,687

(22) Filed: Jun. 15, 2018

(65) Prior Publication Data

US 2018/0365187 A1 Dec. 20, 2018

Related U.S. Application Data

(63) Continuation of application No. 15/696,747, filed on Sep. 6, 2017, now Pat. No. 10,002,097, which is a
(Continued)

(51) Int. Cl.
*G06F 13/40* (2006.01)
*G06F 12/02* (2006.01)
(Continued)

(52) U.S. Cl.
CPC ...... *G06F 13/4027* (2013.01); *G06F 12/0246* (2013.01); *G06F 13/1694* (2013.01);
(Continued)

(58) Field of Classification Search
CPC ............ G06F 13/4027; G06F 13/4022; G06F 13/4282; G06F 12/0246; G06F 13/28; G06F 13/1694; G06F 13/4068
See application file for complete search history.

(56) References Cited

U.S. PATENT DOCUMENTS 5,113,522 A 5/1992 Dinwiddie et al.
5,410,667 A 4/1995 Belsan et al.
(Continued)

FOREIGN PATENT DOCUMENTS

EP 1706824 3/2009

OTHER PUBLICATIONS

Acharya, A., et al., "Active Disks: Programming Model, Algorithms and Evaluation," ACM Sigplan Notices, Association for Computing Machinery, (33)11:81-91 (Nov. 1998).
(Continued)

*Primary Examiner* — Henry Tsai
*Assistant Examiner* — Christopher A Daley
(74) *Attorney, Agent, or Firm* — Fish & Richardson P.C.

(57) ABSTRACT

A computer system is provided. The computer system includes a hub board, a common bus, and a plurality of Sibling boards. The hub board has an I/O controller hub, which includes a main communication chipset. The plurality of Sibling boards is coupled to the hub board by the common bus. Each of the Sibling boards includes a memory and at least one CPU. The memory is operative to host a Sibling operating system. The CPU is coupled to the memory. The Southbridge type chipset which resides in the hub board is shared amongst the plurality of Sibling boards. At least one of the plurality of Sibling boards functions as a master processing unit of the system. Sibling boards offer processing flexibility through the means of how they are configured in the system.

20 Claims, 5 Drawing Sheets

Related U.S. Application Data continuation of application No. 15/293,459, filed on Oct. 14, 2016, now Pat. No. 9,779,051, which is a continuation of application No. 14/853,271, filed on Sep. 14, 2015, now Pat. No. 9,471,519, which is a continuation of application No. 14/244,744, filed on Apr. 3, 2014, now Pat. No. 9,135,203.

(60) Provisional application No. 61/818,412, filed on May 1, 2013.

(51) Int. Cl.
   *G06F 13/16* (2006.01)
   *G06F 13/42* (2006.01)
   *G06F 13/28* (2006.01)

(52) U.S. Cl.
   CPC .......... *G06F 13/28* (2013.01); *G06F 13/4022* (2013.01); *G06F 13/4068* (2013.01); *G06F 13/4282* (2013.01); *G06F 2212/7201* (2013.01)

(56) References Cited

U.S. PATENT DOCUMENTS

| | | | |
|---|---|---|---|
| 5,935,205 A | 8/1999 | Murayama et al. | |
| 6,839,782 B1 | 1/2005 | Scaringella et al. | |
| 7,085,866 B1* | 8/2006 | Hobson | G06F 13/1657 710/100 |
| 7,308,500 B1 | 12/2007 | Miyamoto et al. | |
| 7,353,243 B2 | 4/2008 | Scheuermann et al. | |
| 7,730,077 B2 | 6/2010 | Hinshaw et al. | |
| 8,126,949 B1 | 2/2012 | Scheuermann et al. | |
| 8,346,884 B2 | 1/2013 | Pettey | |
| 8,402,194 B2 | 3/2013 | Hoese et al. | |
| 9,135,203 B2 | 9/2015 | Glickman | |
| 9,471,519 B2 | 10/2016 | Glickman | |
| 9,779,051 B2 | 10/2017 | Glickman | |
| 10,002,097 B2 | 6/2018 | Glickman | |
| 2002/0083221 A1 | 6/2002 | Tsai et al. | |
| 2007/0006306 A1 | 1/2007 | Seifert et al. | |
| 2008/0247443 A1 | 10/2008 | Heidari et al. | |
| 2009/0037691 A1 | 2/2009 | Master et al. | |
| 2009/0037692 A1 | 2/2009 | Master et al. | |
| 2009/0037693 A1 | 2/2009 | Master et al. | |
| 2009/0103594 A1 | 4/2009 | Heidari et al. | |
| 2009/0104930 A1 | 4/2009 | Heidari et al. | |
| 2009/0161863 A1 | 6/2009 | Scheuermann | |
| 2010/0125653 A1* | 5/2010 | Cherian | G06F 13/4004 709/223 |
| 2010/0125679 A1 | 5/2010 | Tang et al. | |
| 2010/0161940 A1 | 6/2010 | Master et al. | |
| 2010/0220706 A1 | 9/2010 | Heidari et al. | |
| 2011/0276822 A1 | 11/2011 | Abdul et al. | |
| 2012/0124333 A1 | 5/2012 | Master et al. | |
| 2012/0198116 A1* | 8/2012 | Cho | G06F 11/1441 710/301 |
| 2012/0265914 A1 | 10/2012 | Master et al. | |
| 2014/0330999 A1 | 11/2014 | Glickman | |
| 2016/0004652 A1 | 1/2016 | Glickman | |
| 2017/0031858 A1 | 2/2017 | Glickman | |
| 2018/0089129 A1 | 3/2018 | Glickman | |

OTHER PUBLICATIONS

Acharya, et al., "Tuning the Performance of I/O-Intensive Parallel Applications,", ACM, pp. 15-27 (May 1996).
Andrade, et al., "Efficient Execution of Multiple Query Workloads in Data Analysis Applications," ACM, pp. 1-11 (Nov. 2001).
Dell, Dell PowerEdge m1000e Modular enclosure Architecture, Jan. 2008.
Dewitt, D., et al., "Parallel Database Systems: The Future of High Performance Database Systems," Communications of the Association for Computing Machinery (3):6:85-98, (Jun. 1992).
Dimakopoulos, V. V., et al., "The SMart Autonomous Storage (SMAS) System," IEEE, vol. 1, pp. 303-306, (2001).
Graefe, G., "Query Evaluation Techniques for Large Databases," ACM Computing Surveys, (25)2:73-170, (Jun. 1993).
Guyetant, S., et al., "Architecture Parallèle Reconfigurable Pour La Génoique," RENPAR'14, ASF, Sympa Conference, pp. 1-4, (Apr. 2002).
Hsu, W. W., et al., "Projecting the Performance of Decision Support Workloads on Systems with Smart Storage (SmartSTOR)," IEEE, pp. 417-425, (2000).
Keeton, K., et al., "A Case for Intelligent Disks (IDISKs)," SIGMOD Record, (27)3:41-52, (Sep. 1998).
Leilich, H., et al., "A Search Processor for Data Base Management Systems," Proceedings of the Fourth International Conference on Very Large Data Bases, IEEE, pp. 280-287, (Sep. 1978).
Memik, G., et al., "Design and Evaluation of a Smart Disk Cluster for DSS Commercial Workloads," J. of Parallel and Distributed Computing, (61)1633-1664, (2001).
Moon, et al., "Evaluation of Predicated Array Data-Flow analysis for Automatic Parallelization," ACM, pp. 84-95 (1999).
Notice of Allowance and Fees Due, 3 pages, combined with Notice of Allowability, 6 pages, with attachments, dated Aug. 7, 2009, U.S. Appl. No. 10/667,128.
Riedel, E., et al., "Active Disks for Large-Scale Data Processing," Computer, IEEE, (34)6:68-74, (2001).
Tanenbaum, Andrew S., et al., Structured Computer Organization, Prentice Hall, 2013.
The IBM Netezza data warehouse appliance architecture: A platform for high performance data warehousing and analytics, IBM Software Information Management, 2011, 12 pages.
The Netezza FAST Engines Framework: A Powerful Framework for High-Performance Analytics, 2008 Netezza Corporation, 12 pages.
Uysal, M., et al., "Evaluation of Active Disks for Decision Support Databases," IEEE, pp. 337-348, (1999).
Wickremesinghe, R., et al., "Distributed Computing with Load-Managed Active Storage," Proceedings of the 11th IEEE International Symposium on High Performance Distributed Computing HPDC—Nov. 2002) (HPDC'02), pp. 13-23, (Jul. 2002).

* cited by examiner

COMPUTER SYSTEM AND A COMPUTER DEVICE

CLAIM OF PRIORITY

This application is a continuation of and claims priority under 35 U.S.C. § 120 to U.S. patent application Ser. No. 15/696,747, filed Sep. 6, 2017, now U.S. Pat. No. 10,002,097, which is a continuation of and claims priority under 35 U.S.C. § 120 to U.S. patent application Ser. No. 15/293,459, filed Oct. 14, 2016, now U.S. Pat. No. 9,779,051, which is a continuation of U.S. patent application Ser. No. 14/853,271, filed Sep. 14, 2015, now U.S. Pat. No. 9,471,519, which is a continuation of U.S. patent application Ser. No. 14/244,744, filed on Apr. 3, 2014, now U.S. Pat. No. 9,135,203, which claims benefit of priority under 35 U.S.C. § 119(e) to U.S. Provisional Patent Application Ser. No. 61/818,412, filed on May 1, 2013, the entire contents of which are hereby incorporated by reference.

FIELD OF THE INVENTION

The present invention relates to a computer system and a computer device, in general, and relates in particular to a computer system and a computer device that utilizes Sibling boards.

BACKGROUND OF THE INVENTION

Computer systems typically include a combination of hardware and software components, application programs, operating systems, processors, buses, memories, input/output devices, and so on. As advances in semiconductor processing and computer architecture push the performance of the computer higher and higher, more sophisticated hardware and software arrangements have evolved to take advantage of the technology, resulting in computer systems today that are much more powerful than just a few years ago.

One of the areas in which progress has been made is managing computer resources in a distributed computing system. Conventionally, distributed computing environments often require complex management schemes and systems for distributing the tasks that constitute the complete job to be performed. The complex management system is responsible for collating the processing results. Such a distributed computing environment requires a linked, dedicated, cluster of computers for performing such processing. The computer cluster usually is a linked group of conventional motherboards containing local disk controllers via a network device. Thus, the network speed is limited by the performance of communication medium, including the network device.

Computer designs have been based on grouping devices that have had similar operational speeds together, so mechanical hard drives which typically had millisecond response rates were grouped together separately from CPUs and memory that resided on a motherboard which had nanosecond response rates. Traditionally disk access has been more of a bottleneck problem than a network switch. Thus, a network switch able to distribute processing across various computer systems has not been an issue. Now, however, solid state drivers (SSD) have been developed which operate at memory speeds and can even exceed speeds at which some current bus controllers can manage. No longer are hard drives a bottleneck of the system, rather they soon will operate at the same speeds of the typical CPU, memory, or any of the processor local bus architectures (Intel®, AMD®, Server ARM® chips, RISC®, IBM® . . . ) which used to be reserved for communicating between the memory and CPU.

SUMMARY OF THE INVENTION

Aspects of the present invention provide a computer system and a computer device. Additional aspects are set forth in part in the description which follows and, in part, are apparent to those of ordinary skill in the art from the description herein, or are can be learned by practice of the presented embodiments by those of ordinary skill in the art.

According to one aspect of the present invention, a Sibling computer system includes first a peripheral hub board, and a plurality of Sibling boards all attached to a common bus. The first peripheral hub board has a dedicated I/O controller which handles peripherals that operate at slower bus speeds than the Sibling board. The Sibling board itself is a reduced computer board with no direct onboard external input/output controlling devices, but is intended to be used in conjunction with a peripheral hub board via a common bus to access the outside world. The Sibling board physically plugs into a common bus that houses the peripheral hub board and receives its I/O support from it. Sibling Boards usually contain CPU, memory, bios, a graphics device, a board clock and a plurality of host and target bus adapters which allow for flexible usage in the system not possible by conventional motherboard designs, and has the capability to have its own operating system that can be different from other Sibling boards using the same peripheral hub board and common bus. At least one of the Sibling boards acts as a master or first host board by utilizing a HBA which controls the common bus which the other slave or target Sibling boards communicate with. Each of the Sibling boards has the option of having a dedicated local hard drive, preferably a solid state drive. The common bus connects the plurality of Sibling boards to the peripheral hub board and the first host Sibling board, wherein at least one of the plurality of Sibling boards functions as either a processing unit or a disk controller of the first host board. The Sibling board technology of the present invention alleviates the prior art problems of complexity and expense.

Furthermore, the present invention has the capacity to accommodate technologies like clusters, distributed systems, and computer appliances while having the option of functioning in a realized manner without having to account for the latency of the internal hardware network switch to communicate between the Sibling boards.

Whereas existing technologies extend the functionality of a disk controller card by embedding Field-Programmable Gate Array (FPGA) units combined with other memory devices for the purpose of filtering and pre fetching data, the modular Sibling board unit is a fully functioning computing unit being capable of hosting an operating system on its own. Thus, a single Sibling board is capable of being flexible enough to be utilized as a host board, a target board or as a disk controller depending on how it is configured. In a particular embodiment, it offers an option of seamlessly connecting to a common bus in parallel to other Sibling boards or in series as a disk controller for other neighboring Sibling boards. Also, according to a particular embodiment of the invention, the physical construction of the Sibling board is physically and electrically able to snap into the common bus as well as communicate with the neighboring Sibling board above or below in parallel as a processing unit or as its disk controller, and all the connections are available onboard to be able to play any of these roles and can be provisioned according to the host operating system. How complex the permutations of the combinations of parallel or series configurations depend on how many boards are connected to the system and how many CPU units are present on the board. It also allows for external connections to other common bus configurations of Sibling boards as well.

A Sibling board computer can function as a low cost general purpose computer appliance that can be configured to accommodate any application with a much greater degree of performance than a generic rigid motherboard computer system. The Sibling board computer can be provisioned to the exact requirements of an application achieving performance gains only once available from expensive computer appliances with highly specialized disk controller cards. Most existing servers utilize rigid generic hardware motherboard construction even if they are utilized as specialized computer appliances. Sibling boards can be configured to resemble regular motherboard, a cluster or a computer alliance that utilizes a Sibling boards as a sophisticated disk controllers that utilize embedded application kernels designed for prefetching. The Sibling board computer can be configured with one Operating System or have the option of utilizing Virtualized Operating Systems. Having a virtual Operation System that doesn't need to share its physical resources avoids the pitfalls of sharing high performance components amongst other virtualized Operating Systems. Each and every Sibling boards can have their own dedicated Operating System resources respectively while simultaneously functioning in an uninhibited virtualized distributed manner. The Sibling boards are a realized machine when its operating system does not have to share its physical resources. Thus, the computer that employs realized machines Sibling board technology seeks to alleviate the common problem that traditional virtual machines have of cannibalizing each other's resources while dramatically improving performance without compromise.

The present invention provides for a flexible configuration of an internal array of Sibling boards that can also act as sophisticated disk controllers that access to storage through a high speed common bus fabric but is not limited by the type of bus fabrics used. Sibling boards that contain more than one CPU can have the option of being further sub-partitioned so each of the boards can function as a processing unit or as a disk controller through the host operating system. The present invention can employ one fabric technology for the entire system, including the common bus and the disk controller bus or it can employ several different type of HBA (Host Bus Adapters) and TBA (Target Bus Adapter) technologies depending what are more conveniently available.

The present invention relates generally to an inventive form of computer architecture that facilitates a completely modular design that is flexible enough to be applied to most tasks to improve performance in a cost effective manner. This flexible design of the present invention encompasses the use of identical Sibling boards arranged in either a series or parallel arrangement by the manner that they are provisioned in the system. By organizing together on the Sibling board the fastest components of what typically comprises a traditional motherboard, they can communicate with each other through a common bidirectional bus in an uninhibited manner, which allows access to storage fluidly. Distributed systems, clustering and similar technologies have relied on a physical network switch to accomplish in one particular embodiment of the invention what the Sibling board can provide entirely in I/O components by implementing a common bus for high speed throughput to storage while placing the traditional bus controller type devices that function at slower speeds on an I/O controller hub on a common bus for external access. The Sibling boards have no requirement for a traditional motherboard, daughterboard to operate in an independent manner.

By utilizing the option of an open source virtual machine software that is modified to recognize the Sibling board as a distinct processing unit combined with the physical arrangement of the Sibling boards, it permits the Sibling boards to be tailored to any type of specific processing in a low cost manner. Whereas current clustering or distributed technologies rely on physical network switch that polls a virtualize fabric (such as InfiniBand®), the modular Sibling board system of the present invention utilizes an emerging high speed fiber fabric technology including Intel's Thunderbolt (Thunderbolt™ is a registered trademark of Apple Inc.), PLX Technology PCIe (Peripheral Component Interconnect Express), and similar type of Fiber Fabric Hub technologies to virtualize the network by binding the network address to the Sibling board ID as an option of a virtualized network address.

An embodiment of the present invention is an inventive form of computer architecture that relies on modular Sibling boards that can be configured in a multipurpose arrangement depending on how they are physically arranged and what kind of operating system is defined on them. The present invention separates the non-essential slower performing I/O components of the traditional motherboard architectures from the Sibling board design. The non-essential I/O components of the Sibling boards can be omitted. Instead, the Sibling boards are connected to commonly shared I/O controller hub in the peripheral hub board. These and other advantages and features of the present invention are obvious to those of ordinary skill in the art in view of the description of the presently preferred embodiments herein below.

BRIEF DESCRIPTION OF THE DRAWINGS

The aspects of the present invention become apparent and more readily appreciated from the following description of the embodiments, taken in conjunction with the accompanying drawings of which.

DETAILED DESCRIPTION OF THE PRESENT EMBODIMENTS

Figure 1:
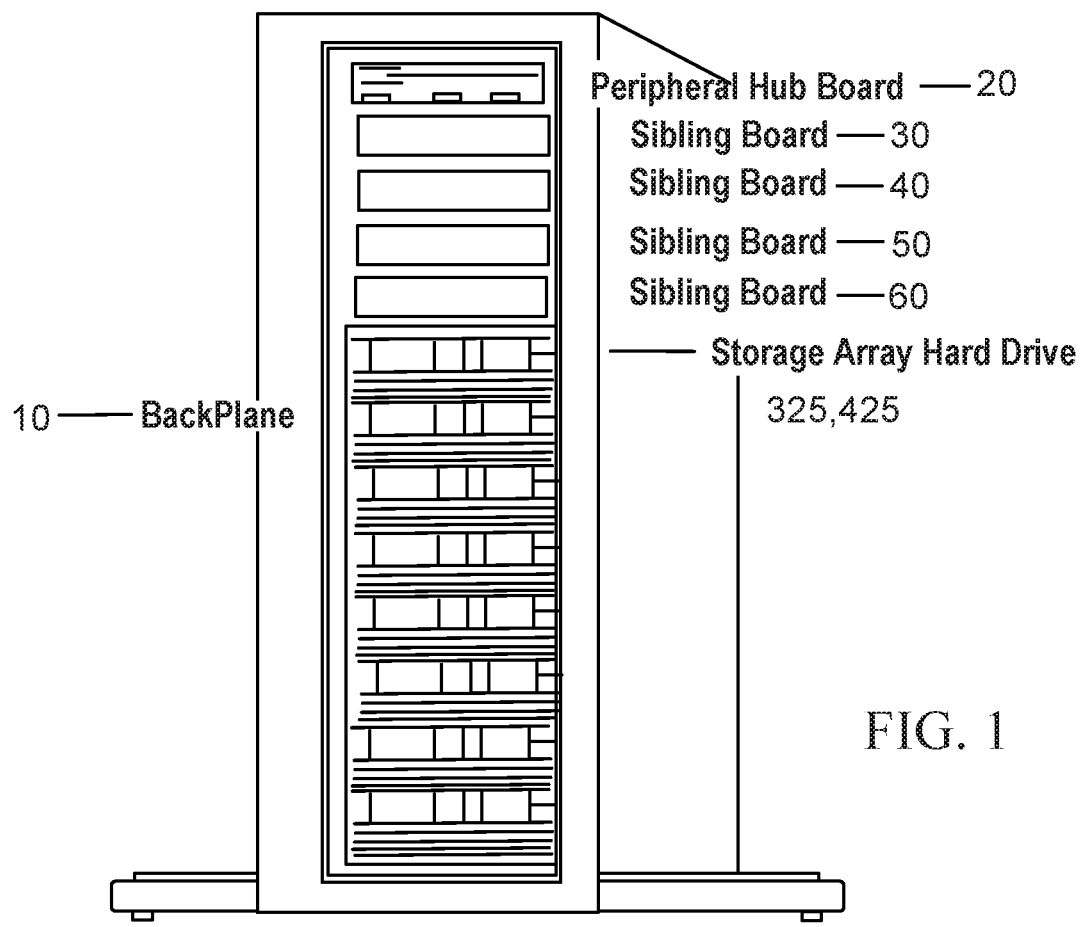
FIG. 1 is an elevational view of a work station implementing the present invention's Sibling boards showing a compact structure thereof.

Reference will now be made in detail to the various embodiments of the invention, examples of which are illustrated in the accompanying drawings, wherein like reference numerals refer to the like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms "comprises" and/or "comprising" are used to specify the presence of stated elements, steps, operations, and/or components, but do not preclude the presence or substitution of like items or addition of one or more other elements, steps, operations, and/or components. The terms "first", "second, and the like may be used to describe various elements, but do not limit the elements. Such terms are only used to distinguish one element from another. These and/or other aspects become apparent and are more readily appreciated by those of ordinary skill in the art from the following description of embodiments of the present invention, taken in conjunction with the accompanying drawings.

FIG. 1 is an elevational view of a work station implementing the present invention's Sibling board configuration showing a compact structure thereof. Referring to FIG. 1, a work station 1 implementing the present invention's Sibling boards is depicted. Work station 1 includes a common bus (also referred to as "backplane") 10, hub board (also referred to as "peripheral hub board") 20, a plurality of Sibling boards 30, 40, 50, and 60, and a plurality of storage hard drives comprised of general storage arrays, only two of which are numbered, a first optional storage array 325, and a second optional storage array 425. Work station 1 includes a simple rack for mounting the plurality of Sibling boards 30, 40, 50, and 60 as part of the common bus 10. Work station 1 can be a sophisticated rack that performs functions of a conventional mother board.

Figure 7:
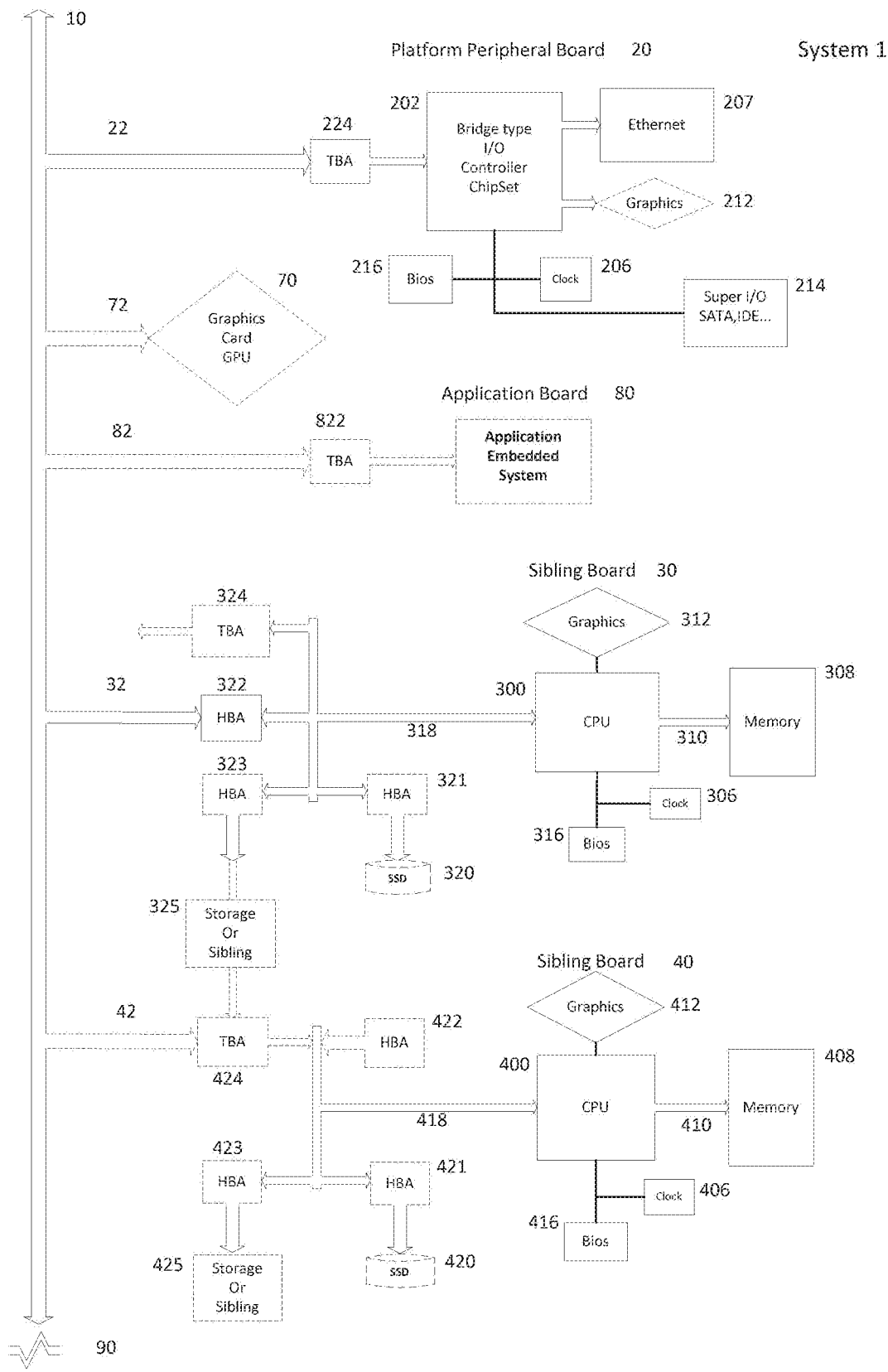
FIG. 7 is an electrical schematic block diagram according to the present invention of a peripheral hub board and a first and a second Sibling boards showing the main components and their configurations.

Hub board 20 physically mounts and is shared amongst a plurality of Sibling boards first and second Sibling boards 30 and 40, and additional Sibling boards 50, and 60, which are depicted as only four in the present embodiment described in FIG. 1. Each of first and second Sibling boards 30 and 40 includes a first optional local onboard storage 320 or a second optional local storage 420 as illustrated in FIG. 7 for the Sibling board's operating system usage and are part of the Sibling board. An optional onboard Sibling board (preferably SSD not shown) storage 320 and 420 respectively (not shown in FIG. 1) are employed to house the Sibling boards local operating systems. These Sibling board local storage drives 320 and 420 are displayed as part of the rectangular Sibling board units 30, 40, 50, and 60 in FIG. 1. First and second optional onboard storages which reside on the physical Sibling board (not shown) function as extra general purpose local data storage hard drives and are capable of local RAID (Redundant Array of Independent Disks) storage.

First and second Sibling boards 30 and 40 are stacked together. Thus, one of advantages of the present invention is that the plurality of Sibling boards can be configured to be more compact and manufactured for a low price because the plurality of the Siblings can be connected to each other or to the hub board 20 without physical network switches and nodes, and the plurality of Sibling boards 30, 40, 50, and 60 and hub board 20 can function together as a single motherboard.

Figure 2:
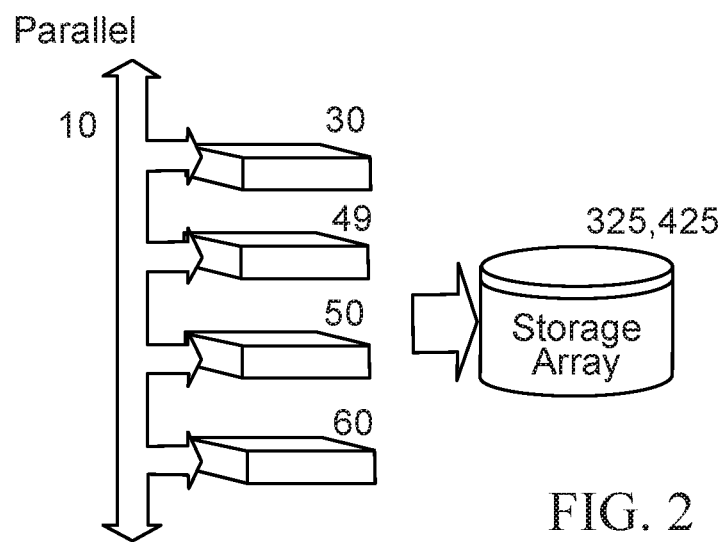
FIG. 2 is a block diagram of an exemplary detailing the flexibility of parallel configurations.

FIG. 2 is a block diagram of an exemplary detailing the flexibility of parallel configurations of Sibling boards. First and second Sibling boards 30 and 40, and a third and a fourth Sibling board 50, and 60 which are shown in FIG. 1, are arranged in a parallel configuration. Sibling boards 30, 40, 50, and 60 include first and second optional storages arrays 325 and 425, as shown in FIG. 7, which can be accessed either through the common bus 10, by the onboard Host Bus Adapters (HBA) or a slot on the board intended for an optional high performance daughter card disk controller.

Figure 3:
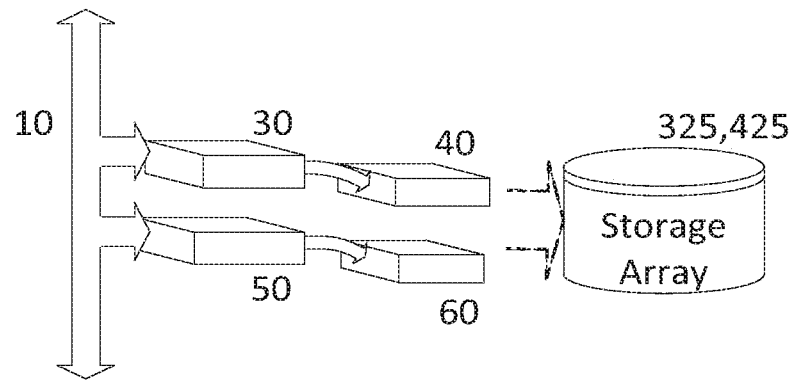
FIG. 3 is a block diagram of another exemplary detailing the flexibility of Series-Parallel configurations

FIG. 3 is a block diagram of another exemplary detailing the flexibility of Series and Parallel configurations. First and third Sibling boards 30 and 50 are arranged in a parallel configuration. Second and fourth Sibling boards 40 and 60 are arranged in a serial configuration as embedded disk controllers to first and third Sibling boards 30 and 50 respectively. This arrangement allows for application kernels to be used to pre-fetch data from first and second option storage arrays 325 and 425. When Sibling boards are configured as Disk Controllers that are capable of utilizing compression algorithms in a Series arrangement to pre-fetch data from the optional storage arrays, significant performance gains can be realized.

Figure 4:
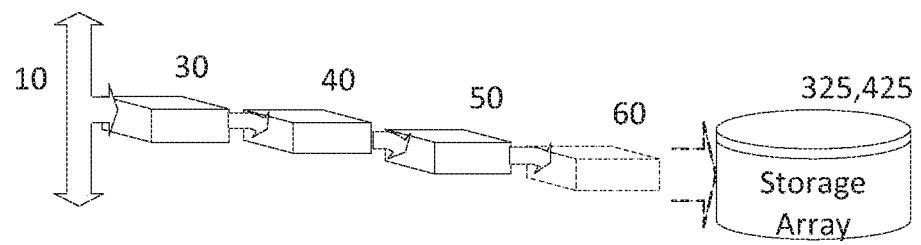
FIG. 4 is a block diagram of the other exemplary detailing the flexibility of Series-Series configurations.

FIG. 4 is a block diagram of the other exemplary detailing the flexibility of Series-Series configurations. Sibling boards 30, 40, 50, and 60 are a serial arrangement, extending from one another and include first and second optional storages 325 and 425. The fourth Sibling board 60 illustrated in dotted lines represents a plurality of an extended series to series of boards. As illustrated in FIG. 4, third and fourth slave mode Sibling boards 50 and 60 can be used as disk controllers for the previous stage to offer multiple stages of prefetching. This arrangement allows that many stages of prefetching can be employed by chaining Sibling boards as disk controllers one after the other.

FIGS. 2 to 4 show examples of some of the possible physical arrangements that Sibling boards can have. Sibling boards 30, 40, 50, and 60 have many options for accessing optional storage. For example, optional storage can be connected to the common bus 10. In another example, Sibling boards 30, 40, 50, and 60 can access the optional storage via onboard HBAs, or when the boards are employed in series as a disk controller. Optionally there can be a slot provided on Sibling boards 30, 40, 50, and 60 for enabling a physical insertion to utilize third party disk controllers as an optional device. Sibling boards 30, 40, 50, and 60 attached in a serial configuration can be arranged for prefetching. By embedding application code on each level, it can allow the processing of many stages of prefetching. Sibling boards 30, 40, 50, and 60 attached in a parallel configuration can distribute processing across them simultaneously in a distributed manner. Thus, according to the present invention, customized combinations can be implemented to tune the Sibling Board computer appliance to any application, whereas currently available computer appliances are not as flexible.

Figure 5:
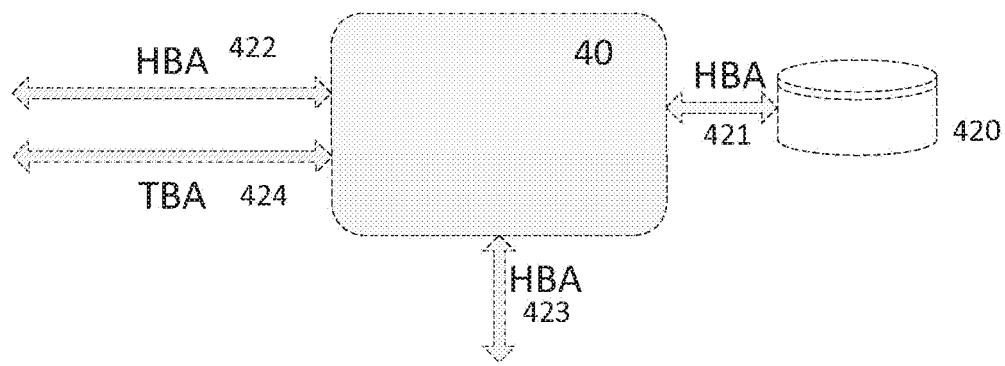
FIG. 5 is a block diagram of a Sibling boards Bus Adapter configuration when one bus technology is uniformly employed throughout the system.

FIG. 5 is a block diagram of a Sibling board Bus Adapter configuration when one bus technology is uniformly employed throughout the system. Although not illustrated in FIGS. 1-4 in details, Sibling board 40 can be connected to TBA (Target Bus Adapter) 424 adapter that can be shared with the common bus 10 in a parallel connection or can be connected to another Sibling board above or below as a series disk controller. This configuration is possible if a singular computer bus technology is used throughout the entire system. Especially with Intel based systems, there are many available competing bus adapter technologies. Sibling board 40 can utilize various types of adapter technologies. The entire enclosure of Sibling board 40 has the ability to be connected to common bus 10, with neighboring Sibling master board 30 above, or other target Sibling board 50, and 60 below. The entire enclosure of Sibling board 40 can have an optional local storage 420 for the purpose of housing an Operating system. Sibling board 40 can be connected to optional local storage and can use it to house its operating systems and such.

Figure 6:
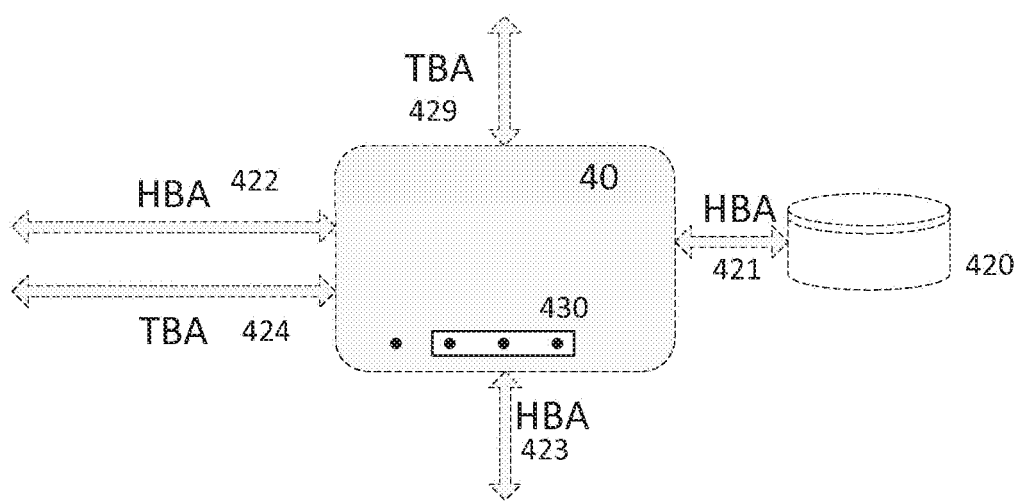
FIG. 6 is a block diagram of a Sibling boards Bus Adapter configuration when more than one bus technology is employed throughout the system.

FIG. 6 is a block diagram of a Sibling board Bus Adapter configuration where more than one bus technology is employed throughout the system. Unlike TBA 424 illustrated in FIG. 5, TBA 424 adapter illustrated in FIG. 6 does not need to be shared with other devices. Rather than having one exclusive bus technology, Sibling board 40 can accommodate several bus connector technologies for suitable CPUs that have several types of competing bus adapter technologies. For example, an additional TBA 429 adapter illustrated in FIG. 6 facilitates a different bus adapter technology, which can be employed for example as a series disk controller to a neighboring host Sibling master board 30 (not shown in FIG. 6). Sibling board 40 also has the option of having a slot 430 thereon. Slot 430 can accommodate a daughter card therein, which can be used as a storage array disk controller.

FIG. 7 is an electrical schematic block diagram of a first system 1 according to the present invention of a hub board 20 and an exemplary any number of Sibling boards, such as first and second Sibling boards 30 and 40 showing the main components and their configurations. System 1 can include an Intel or AMD type of system. Sibling boards 30 and 40 can include any number of existing CPU technologies including SoC (System-on-Chip) types of processor chips. For exemplary purposes, it is described herewith that computer system 1 has Sibling board 30 and includes currently commercially used Intel/AMD technology. However, the type of CPU or processor is not limited thereto and computer system 1 can employ various other types of CPU's or processors.

Computer system 1 generally includes two parts: a peripheral hub board also called hub board 20 as the first part and a plurality of Sibling boards, such as first and second Sibling boards 30 and 40, as the second part. Hub board 20 provides I/O controller hub 202 which is shared with first and second Sibling boards 30 and 40. I/O controller hub 202 can be shared with additional Sibling boards (not shown in FIG. 7) that are attached to common bus 10. I/O controller hub 202 can interface with slower peripheral devices like keyboards, mouse, serial connector and video. I/O controller hub 202 can also interface with either an Ethernet device 207 which can be a router, switch (not shown), a wireless interface or including any combination of existing network devices.

First and second Sibling boards 30 and 40, in turn, provide a processing unit 300 and 400 separately of computer system 1. Hub board 20 is connected to first and second Sibling boards 30 and 40 via common bus 10. Common bus 10 is depicted as being physically connected to its component parts. Although only two Sibling boards are depicted, computer system 1 can include additional Sibling boards, which are similar to Sibling boards 30 and 40 described herewith.

Hub board 20 can be comprised of commercially available Intel/AMD type chipsets of SoC chips. A chipset is a set of one or more conventional integrated circuits that manage the data flow between the processor, memory and peripherals, thus controlling communications between a processor (CPU) and external devices. The conventional term "Northbridge refers to communication links between a CPU to very high-speed devices such as RAM and graphics controllers. The conventional term "Southbridge" refers to communication links between a CPU and lower-speed peripheral buses. The aforementioned I/O controller hub 202 is comprised of a conventional peripheral bridge type I/O controller chipset and is connected to a main network switch (not shown). I/O controller hub 202 is directly connected to a super I/O 214, which includes a SATA (Serial Advanced Technology Attachment), an IDE (Integrated or Interactive Development Environment), a parallel port (not shown), and a USB (Universal Serial Bus)(not shown). Controller hub 202 is also connected to an external Ethernet 207, and an optional Graphics card 212. Hub board 20 further includes a clock 206 and a BIOS memory 216, Erasable Programmable Read Only Memory (EPROM). Hub board 20 is a peripheral hub board sharing I/O controller hub 202 with first and second Sibling boards 30 and 40 electrically and in the current embodiment is physically connected thereto.

Hub board 20 is also coupled to a TBA (Target Bus Adapter) 224 for a connection with common bus 10. TBA 224 supports a variety of controller technologies. For example, TBA 224 can support SATA Ill, Thunderbolt interface (Thunderbolt is a registered trademark of Apple Inc.), PLX Technology PCIe (Peripheral Component Interconnect Express), and Fiber Fabric Hub technologies.

Hub board 20 is physically and electrically coupled to common bus 10 by a conventional board connector 22. Board connector 22 can be configured to provide power as well.

In addition, common bus 10 physically and electrically connects first and second Sibling boards 30 and 40 to hub board 20. Common bus 10 which can be of a conventional Intel type includes conventional extended bus technologies, such as SATA III, Thunderbolt, PLX Technology PLIe, PCI Express, Fiber Fabric Hub. I/O controller hub 202 functions as a traditional Southbridge type chipset managing peripheral devices. Ethernet device 207 provides a network connection to first Sibling board 30 and second Sibling board 40 via common bus 10.

First and second Sibling boards 30 and 40 are processing units for computer system 1. Thus, in some embodiments, hub board 20 can be configured with or without a CPU and/or without a memory. In this exemplary embodiment stead, hub board 20 shares I/O controller hub 202 with first and second Sibling boards 30 and 40, which contain a CPU 300 and 400 respectively and memory. As depicted in FIG. 7, first and second Sibling boards 30 and 40 are configured without I/O controller components and instead via common bus 10 uses I/O controller hub 202, which resides on hub board 20. Also, at least one of the Sibling boards 30 is configured as a master node.

Sibling boards 30 and 40 are depicted in FIG. 7 as comprising essentially the same components and connections numbered in the 300 and 400 series respectively. As such, only Sibling board 30 will be described herein. However, the Sibling boards need not be the same and they can have different components, configurations and connections in alternative embodiments. In the exemplary depicted configuration of FIG. 7, first Sibling board 30 functions as a master node and second Sibling board 40 functions as a slave node. First board 30 is connected to common bus 10 via HBA 322.

First Sibling board 30 includes first CPU 300 that is connected to a plurality of board components: a first clock 306, a first memory 308, a first graphics controller 312, and a first BIOS 316. First memory 308 is coupled to first CPU 300 via a memory bus 310. Depending on the type of CPU employed one or more of the components can reside on first CPU 300 chip. First Sibling board 30 is comprised in one embodiment of the invention of four basic forms of bus controllers/adapters, one of which is a TBA 324 and three of which are HBA 321, 322 and 323. Each controller/adapter employs an extended bus technology such as a SATA Ill, a Thunderbolt Interface, and PCI Express, PLX technology PLIe, and chipsets. The controllers/adapters are configured as known in the art to define the base controllers that are employed because there are commercially available bidirectional chipsets. In the present invention, each bus adapter is able to connect to either common bus 10 or another Sibling board, as desired.

Figure 8:
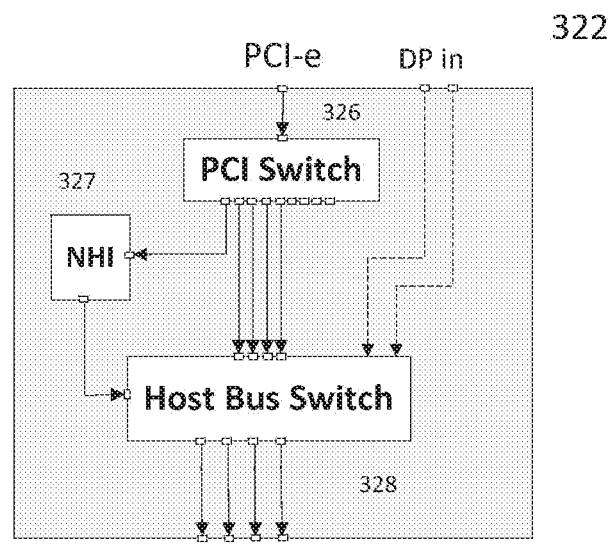
FIG. 8 is an electrical schematic block diagram details of a commercially available Host Bus Adapter.

FIG. 8 is an electrical schematic block diagram details of a Host Bus Adapter. FIG. 8 illustrates an example of HBA employed in Intel type technology, which is generally compatible with other CPU technology. An HBA includes a high performance PCI switch 326, an NHI (Native Host Interface) 327, and a Host Bus Switch 328. PCI Switch 326 enables a PCI uplink for downstream devices and NHI 327 is a switch that manages DMA (Direct Memory Access). NHI 327 is used for device discovery and other conventional HBA activities which manage the fabric. PCI Switch 326 receives its PCI input from an upstream common bus connection through Host bus Switch 328. Host Bus Switch 328 can interface with various types of CPU architectures, including but not limited to Intel®, AMD®, Server ARM® chips, RISC®, and IBM®.

Figure 9:
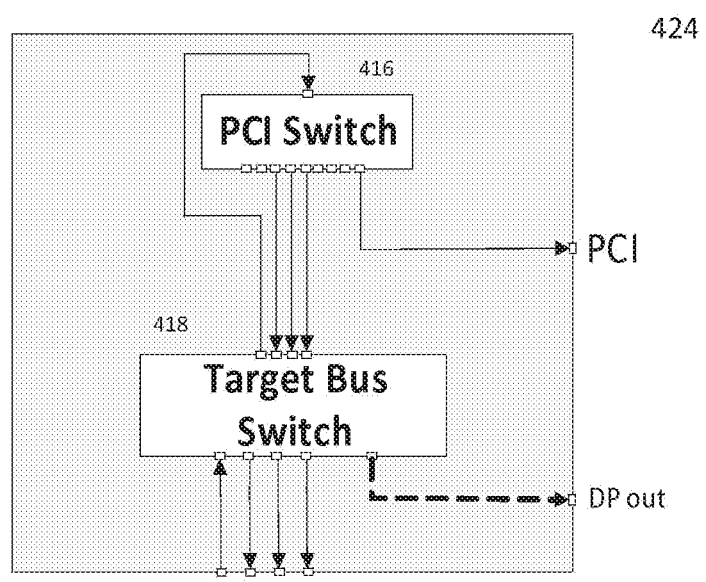
FIG. 9 is an electrical schematic block diagram details of a commercially available Target Bus Adapter.

FIG. 9 is an electrical schematic block diagram of a TBA (Target Bus Adapter). Generic Target or End Bus Controller is a demonstration of the possible features depending on which type of Bus Controller is utilized. A path can be established by routing a PCI upstream connection from PCI Switch 326 in the particular HBA through host bus Switch 328 and across common bus 10 to target bus Switch 418 and to PCI Switch 416 in the TBA 424. TBA as illustrated in FIG. 9 is compatible with various types of CPU architectures including but not limited to Intel®, AMD@, Server ARM® chips, RISC®, and IBM@. The types of TBA can be determined to interface with them.

Referring to FIG. 7, first HBA 322 connects to common bus 10 and first Sibling board 30 functions as a master node. Second HBA 321 connects to a first optional local storage 320, which can be preferably a Solid State Drive. The third HBA 323 connects to an optional storage array 325. Alternatively, HBA 323 can optionally connect to another Sibling board or a storage array (not shown). The optional first TBA 324 in the depicted configuration is unused in this example, but is available if needed in other examples that are known to those of ordinary skill in the art. First Sibling board 30 is operative to host a first Sibling operating system (not shown) and is connected to first memory 308 and to an optional local storage 320.

As depicted in the embodiment of FIG. 7, first Sibling board 30 functions as a processing unit of hub board 20. First Sibling board 30 is connected to I/O controller hub 202 and to a main network card/switch including Ethernet device 207. First Sibling board 30 is connected to the hub board 20 via common bus 10 and a host connector 32 which provides power and physical support.

Second Sibling board 40 includes a second CPU 400 that is connected to a second clock 406, a second memory 408 via a second memory bus 410, a second graphics controller 412, and a second BIOS 416. Second Sibling board 40 also includes a fourth, a fifth and a sixth HBAs 421, 422, and 423 and a second TBA 424.

Fourth HBA 421 is an optional host bus controller that is configured to connect to a second optional local storage 420, and functions as a host in conjunction with an operating system running in a slave node role. Therefore it does not require a software implementation of a network switch. However, it does not limit or exclude the software implementation of a network switch.

Fifth and sixth HBAs 422 and 423 are configured to support the controller technology applied to common bus 10, including conventional SATA III, PLX technology PCIe, PCIe, and/or Thunderbolt. Fifth HBA 422 is installed in second Sibling board 40 as an optional spare and is not connected to other electronic components in this embodiment. Sixth HBA 423 can act as a host controller for either another Sibling board (not shown) or can act as disk controller to a storage array 425.

A second TBA 424 is configured to support the controller technology applied to the common bus 10 including SATA III, PLX technology PLIe, PCIe, and/or Thunderbolt interface. Second TBA 424 has a mutually exclusion option to connect to common bus 10 or to another Sibling board, for example to first Sibling board 30 or any other additional Sibling boards (not shown). In this configuration, it results in either a series or parallel connection between the Sibling boards 30 and 40. Second TBA 424 is connected to common bus 10 via a target connector 42 that provides both a power and a physical support.

Second Sibling board 40 is operative to host a second Sibling operating system (not shown) and is connected to second memory 408 and to second optional storage 420. The second optional local storage 420 can be an SSD (Solid State Drive), for example. Each of Sibling boards 30 and 40 is fully capable of hosting the same or different operating system if a virtual Operating System is employed. Such conventional operating systems can include, for example, Microsoft Windows, UNIX or Linux.

First and second optional local storages 320 and 420 can have an additional SSD and a RAID mirror respectively. For example, second optional local storage 420 can have a conventional RAID 0 setup within the SSD structure. Also, first and second optional local storages 320 and 420 can each be comprised of more than one SSD. For example second optional storage 420 can have a RAID 0 setup with two SSDs.

First and second Sibling boards 30 and 40 function as a processing unit of the hub board 20, and they are connected to and share the I/O controller hub 202 and the main network switch (not shown) residing on hub board 20. First and second Sibling boards 30 and 40 do not require an external network switch to communicate because they are directly connected to the shared main network device that resides on hub board 20 by common bus 10. Although an onboard network card is not precluded, it is not necessary. That is because communication between hub board 20 and Sibling boards 30 and 40 can be facilitated by a unique type of Sibling Board ID number. Thus, first and second Sibling boards 30 and 40 can have a network connection with Ethernet device 207 that resides on hub board 20 via such communication.

Thus, according to the present invention, computer system 1 is established without external network switches. This results in a spatially compact computer system that can have a relatively low price. Common bus 10 is connected to first Sibling board 30 via host connector 32. Common bus 10 is connected to second Sibling board 40 via target connector 42.

Each of first and second Sibling boards 30 and 40 can contain an internal software type of network switch to interface with other Sibling boards. Each of the plurality of Sibling boards 30 and 40 includes, for example, a SATA III disk controller that connects to a conventional internal Solid State Drive that houses the operating system of Sibling Boards 30 and 40. Optional local storages 320 and 420, connected to first and second Sibling boards 30 and 40, in different embodiments can be a location for the Operating System, for a cache memory and for temporary processing and/or swap space.

First Sibling board 30 and second Sibling board 40 are configured so that conventional Southbridge peripheral interface type chipsets are not required. Instead, each is connected to I/O controller hub 202 that resides on the hub board 20 through common bus 10. Thus, first Sibling board 30 and second Sibling board 40 cannot function unless it can utilize I/O controller hub 202 which has all the components configured to interface with the outside world.

The present invention as configured as described above includes first Sibling board 30 and second Sibling board 40 that can be flexibly configured for parallel and/or series connections such that each board can function in various roles. Such roles include being a processing unit with pre-filters that is configured or arranged as processing units which can be tuned for the needs of one application and then returned or reconfigured for others. This is distinguished from a conventional blade server that is configured to have only one physical board with rigid, fixed pin connectors for daughter boards such that CPUs can only go into designated slots.

Each Sibling board 30 and 40 includes a hub/target controller that is configured to be accessed by common bus 10 which has ability to contain full operating systems or act strictly as a traditional disk controller. Each Sibling board 30 and 40 is modified from a standalone unit on the network by having included on it a high performance modern PCI type connector to connect to a community bus hosted by the hub board 20. Each Sibling board 30 and 40 does not function as a standalone unit which is connected to a conventional network as a typical motherboard. Each Sibling board 30 and 40 requires, in the present embodiment, a hub board, such as hub board 20, in order to be operational. Each Sibling board 30 and 50 has the option of having its own SSD. In the embodiment of FIG. 7, the SSD is connected to first and second Sibling boards 30 and 40 by a specialized internal PCI bus connector. Conventional bus connectors include, for example SATA III or other current, commercially available high speed controllers. This results in a physical configuration that has a relatively extremely small footprint. Optional local storages 320 and 420 function for their respective Sibling boards for local swap space of an operating system.

As noted above, the present description of the present invention utilizes only two Sibling boards, namely first and second Sibling boards 30 and 40, each having only one CPU, but the present invention encompasses a plurality of more than two Sibling boards that can each contain multiple CPUs, and the descriptions above are to be construed as also encompassing more than two Sibling boards.

Thus, according to the present invention, computer system 1 is virtualized to provide hub board 20 for sharing the peripheral I/O controller hub 202, whereby first and second Sibling boards 30 and 40 are utilized for data processing. However to the underlying virtual machine software that links the systems together at the lowest level, the entire system appears as if it is one computer system. Virtual machine software enables more than one operating system to be installed on computer system 1.

Further modifications of the presently described embodiment include utilizing one or more Sibling boards with one of the adapter technologies Thunderbolt, PLX Technology PCIe (Peripheral Component Interconnect Express), and Fiber Fabric Hub technologies. Thus, depending on which type of Bus Controller is utilized, the Sibling boards can be established with or without virtualization software.

By separating the slower peripheral Southbridge type chipsets to a dedicated hub board 20 that is shared by the connected Sibling boards, the system according to the present invention allows the high performance processing of data to be concentrated specifically on the Sibling boards.

The SSDs in Sibling boards 30 and 40 can be used with a conventional operating system and/or swap space depending on how many SSDs are attached. As a result of the modular design of Sibling boards 30 and 40, it is unnecessary to install a full operating system on each Sibling board because one of the Sibling boards is fully capable of operating as a disk controller when attached to another Sibling boards.

A PCI type slot on Sibling boards 30 and 40 can accommodate an advanced disk controller to access storage. In the present invention, Sibling board 30 functions as a virtual master node that is fully capable of also being an internal domain server and network switch, depending on the type of server operating system that is installed and how it is configured. By having a dedicated virtual operating system on Sibling boards 30 and 50, each becomes a realized machine that doesn't have to share its physical resources with another the Sibling board. Open source virtual machine software can be modified so that it recognizes each of Sibling boards 30 and 40 in the virtualized computer system 1 and can seamlessly assign Operating System resources to the other Sibling boards as if they were regular Virtual Machines. It is possible to have the realized machines as part of the installed bios of the machine or installed in a similar manner as current virtual machine software is installed.

Also, operating systems can be striped across many Sibling boards with one IP address assigned to each one. The amount of flexibility that the Sibling boards' technology provides is achieved by the configuration of their respective operating systems and the physical arrangement of the Sibling boards in the computer system 1.

First and second Sibling boards 30 and 40 achieve their flexibility entirely from how they are physically arranged in the system and how the operating system is applied to them. The software that achieves the Sibling board's flexibility employs a modified version of the Open Source Virtual Machine Software and is conventional and known in the art.

By modifying Open Source Virtual Machine software so that it recognizes each installed Sibling boards 30 and 40 as if it were part of hub board 20, Sibling boards 30 and 40 can function as realized machines.

Computer system 1 further includes an optional graphics card 70. Optional graphic card 70 is an optional GPU high performance graphics card is connected to common bus 10 via a bus connector 72. Computer system 1 includes an application board 80. Application board 80 can be one or many embedded system that is application specific. Application board 80 is connected to common bus 10 via a third TBA 822. Third TBA 822 is connected to common bus 10 via a bus connector 82.

The present invention can be applied to a general computer, a laptop computer, MCM in a medical device, regular workstation, a new form of super computer, database machine, genome machine, military device, robots, data center, entertainment center and super graphic CGI machine. The present invention, for instance, can be used for gaming with each player getting their own Sibling board.

The Sibling board technology can be applied to workstations, rack mounted units and even larger computing systems. The present invention is not just another form of intelligent disk controller. Rather, it is a modular computing unit capable of benefitting from its arrangement in the system.

The low cost modular Sibling board drive has an internal bus connecter to a local Solid State Drive, which is where its operation system is. Its modular design permits almost any device that comprises the unit to be easily replaced. If a hard drive fails, it can be easily removed and a new Solid State Drive can be snapped into place. There are conventional miniaturized Solid State Drives that are now attached to regular sized motherboards that act like extended memory. This new design takes advantage of recent miniaturization of traditional motherboard technology by effectively attaching a motherboard to the physical footprint of a solid state drive. Thus, the modular solid state Sibling board drive unit can appear to be almost the same shape and size as a regular conventional disk drive with all the components of a traditional motherboard accessible in one self-contained modular unit that is easy to repair and upgrade.

To be able to take advantage of not only the embedded virtual machine technology in the current processor chips, open source virtual machine software (like Xen, KVM . . . ) can be modified to recognize the Modular Sibling Board as a distinct unit and installed on a virtually assigned "master node" to allow easy set-up of rest of the machine. By having the option of employing a pliable or fixed cable fiber bus that allows flexible connections to be made, the Sibling board can be attached to a backplane primarily for physical support.

The present invention has been described mainly with respect to a printed circuit board embodiment. However, parts of the present invention can obviously be incorporated into a multi-function integrated circuit, thereby further reducing the footprint of the disclosed embodiments, and increasing the speed of response of the invention.

It is to be understood that the exemplary embodiments described herein are that for presently preferred embodiments and thus should be considered in a descriptive sense only and not for purposes of limitation. Descriptions of features or aspects within each embodiment should typically be considered as available for other similar features or aspects in other embodiments.

I claim:

1. A solid state drive comprising:
an interface configured to communicate with one or more external device;
a bus;
a solid state controller configured to communicate over the bus, the solid state drive controller utilizes at least one of a central processing unit, a field-programmable gate array, and a graphical processing unit; and
memory units, each memory unit being a volatile memory unit or a nonvolatile memory unit, each memory unit being connected to the bus and connected in series to one or more of the other memory units, wherein the solid state drive controller includes an embedded application to pre-fetch data, wherein the solid state drive controller utilizes the one or more of the memory units connected in series for staging prefetching operations;
wherein each memory unit is capable of at least one of hosting an operating system different from another operating system being hosted by another of the memory units, and, hosting an operating system being used by at least another of the memory units, each memory unit having a dedicated physical resource for the operating system hosting, each memory unit is capable of communicating with the solid state drive controller using the bus, and, each memory unit is capable of communicating with each of the other memory units.

2. The solid state drive of claim 1, wherein the memory units are included in a field programmable gate array.

3. The solid state drive of claim 1, wherein one of the memory units hosts a first operating system and another of the memory units hosts a second operating system, different from the first operating system.

4. The solid state drive of claim 1, wherein one of the memory units and another of the memory units host one operating system.

5. The solid state drive of claim 1, wherein the one or more of memory units is included in a field programmable gate array, an ASIC, a GPU or a SOC.

6. The solid state drive of claim 1, wherein the interface connects to one or more neighboring solid state drives.

7. The solid state drive of claim 6, wherein one of the one or more neighboring solid state drives is controlled by a RAID disk controller.

8. The solid state drive of claim 1, wherein the one or more external device includes an external storage device.

9. The solid state drive of claim 1, wherein an external or an internal embedded application kernel manages operations of the solid state drive controller.

10. A solid state drive comprising:
an interface configured to communicate with one or more external device;
a bus;
a solid state controller configured to communicate over the bus, the solid state drive controller utilizes at least one of a central processing unit, a field-programmable gate array, and a graphical processing unit; and
memory units, each memory unit being a volatile memory unit or a nonvolatile memory unit, each memory unit being connected to the bus and connected in parallel to one or more of the other memory units, wherein the solid state drive controller includes an embedded application to pre-fetch data, wherein the solid state drive controller utilizes the one or more of the memory units connected in parallel for staging prefetching operations;
wherein each memory unit is capable of at least one of hosting an operating system different from another operating system being hosted by another of the memory units, and, hosting an operating system being used by at least another of the memory units, each memory unit having a dedicated physical resource for the operating system hosting, each unit is capable of communicating with the solid state drive controller using the bus, and, each memory unit is capable of communicating with each of the other memory units.

11. The solid state drive of claim 10, wherein the memory units are included in a field programmable gate array.

12. The solid state drive of claim 10, wherein one of the memory units hosts a first operating system and another of the memory units hosts a second operating system, different from the first operating system.

13. The solid state drive of claim 10, wherein one of the memory units and another of the memory units host one operating system.

14. The solid state drive of claim 1, wherein hashing, indexing, encryption, or compression is utilized to pre-fetch data.

15. The solid state drive of claim 10, wherein the one or more of memory units is included in a field programmable gate array, an ASIC, a GPU or a SOC.

16. The solid state drive of claim 10, wherein the interface connects to one or more neighboring solid state drives.

17. The solid state drive of claim 16, wherein one of the one or more neighboring solid state drives is controlled by a RAID disk controller.

18. The solid state drive of claim 10, wherein the one or more external device includes an external storage device.

19. The solid state drive of claim 10, wherein an external or an internal embedded application kernel manages operations of the solid state drive controller.

20. The solid state drive of claim 10, wherein hashing, indexing, encryption, or compression is utilized to pre-fetch data.

* * * * *